United States Patent
Kobayashi et al.

(10) Patent No.: US 8,000,085 B2
(45) Date of Patent: *Aug. 16, 2011

(54) SOLID ELECTROLYTIC CAPACITOR

(75) Inventors: Yasumi Kobayashi, Yawata (JP); Takashi Umemoto, Hirakata (JP); Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 295 days.

This patent is subject to a terminal disclaimer.

(21) Appl. No.: 12/273,622

(22) Filed: Nov. 19, 2008

(65) Prior Publication Data

US 2009/0128996 A1    May 21, 2009

(30) Foreign Application Priority Data

Nov. 21, 2007   (JP) .............................. JP2007-301094

(51) Int. Cl.
*H01G 4/06* (2006.01)
*H01G 5/013* (2006.01)

(52) U.S. Cl. ....................................... 361/524; 29/25.03

(58) Field of Classification Search .................. 361/524, 361/523; 29/25.03
See application file for complete search history.

(56) References Cited

U.S. PATENT DOCUMENTS

| | | | |
|---|---|---|---|
| 6,741,448 B2 * | 5/2004 | Mido et al. ...................... | 361/302 |
| 6,775,126 B2 * | 8/2004 | Fujii et al. ...................... | 361/523 |
| 6,852,137 B2 * | 2/2005 | Miki et al. ..................... | 29/25.03 |
| 6,917,514 B2 | 7/2005 | Mido et al. | |
| 7,042,709 B2 | 5/2006 | Kobayashi et al. | |
| 7,242,073 B2 | 7/2007 | Mosley et al. | |
| 2002/0003689 A1 * | 1/2002 | Sakai et al. ..................... | 361/525 |
| 2003/0182781 A1 * | 10/2003 | Miki et al. ..................... | 29/25.03 |
| 2004/0049899 A1 * | 3/2004 | Fujii et al. ..................... | 29/25.03 |
| 2004/0104450 A1 * | 6/2004 | Arai et al. ...................... | 257/532 |
| 2004/0130856 A1 * | 7/2004 | Fujii et al. ..................... | 361/523 |

FOREIGN PATENT DOCUMENTS

JP         03064014 A  *  3/1991

* cited by examiner

*Primary Examiner* — Eric Thomas
(74) *Attorney, Agent, or Firm* — Marvin A. Motsenbocker; Mots Law, PLLC

(57) ABSTRACT

A solid electrolytic capacitor that prevents leakage current from increasing. The solid electrolytic capacitor includes an anode, a cathode, and a dielectric layer arranged between the anode and the cathode in contact with the cathode. The dielectric layer includes a plurality of recesses arranged in the surface of the dielectric layer, each recess having an opening in an interface with the cathode. Each of the recesses has a depth that is 0.1 to 1.5 times the diameter of the opening.

5 Claims, 3 Drawing Sheets

Fig.3

| | Solid Electrolytic Capacitor | Anodization Conditions | | | Average Pit Depth (Relative to Average Pit Diameter) | Property Index |
|---|---|---|---|---|---|---|
| | | Temperature | Voltage Amplitude | Voltage Cycle | | |
| Ex.2 | A2 | 30℃ | 0.2V | 10min | 0.25nm (0.1x) | 0.10 |
| Ex.3 | A3 | 35℃ | 0.2V | 10min | 1.25nm (0.5x) | 0.07 |
| Ex.1 | A1 | 40℃ | 0.2V | 10min | 2.50nm (1x) | 0.05 |
| Ex.4 | A4 | 45℃ | 0.2V | 10min | 3.75nm (1.5x) | 0.06 |
| Comp. Ex. | X | 40℃ | - | - | - ( - ) | 0.20 |

Fig.4

| | Solid Electrolytic Capacitor | Anodization Conditions | | | Average Pit Diameter | Property Index |
|---|---|---|---|---|---|---|
| | | Temperature | Voltage Amplitude | Voltage Cycle | | |
| Ex.6 | A6 | 40℃ | 0.2V | 2min | 0.1nm | 0.12 |
| Ex.5 | A5 | 40℃ | 0.2V | 5min | 0.2nm | 0.10 |
| Ex.7 | A7 | 40℃ | 0.2V | 7min | 1.0nm | 0.07 |
| Ex.1 | A1 | 40℃ | 0.2V | 10min | 2.5nm | 0.05 |
| Ex.8 | A8 | 40℃ | 0.2V | 13min | 5.0nm | 0.06 |
| Ex.9 | A9 | 40℃ | 0.2V | 15min | 10.0nm | 0.07 |
| Ex.10 | A10 | 40℃ | 0.2V | 17min | 20.0nm | 0.08 |
| Ex.11 | A11 | 40℃ | 0.2V | 20min | 50.0nm | 0.10 |
| Ex.12 | A12 | 40℃ | 0.2V | 60min | 70.0nm | 0.12 |
| Comp. Ex. | X | - | - | - | - | 0.20 |

SOLID ELECTROLYTIC CAPACITOR

CROSS-REFERENCE TO RELATED APPLICATIONS

This application is based upon and claims the benefit of priority from the prior Japanese Patent Application No. 2007-301094, filed on Nov. 21, 2007, the entire contents of which are incorporated herein by reference.

BACKGROUND OF THE INVENTION

The present invention relates to a solid electrolytic capacitor.

A typical solid electrolytic capacitor is manufactured by anodizing an anode, which is made of a valve metal such as niobium (Nb) and tantalum (Ta), to form a dielectric layer including mainly oxides on the surface of the anode. Then, an electrolyte layer is formed on the dielectric layer, and a cathode layer is formed on the electrolyte layer. Japanese Laid-Open Patent Publication No. 4-48710 describes an electrolyte layer formed by superimposing a first conductive polymer layer of polypyrrole formed through chemical polymerization onto a second conductive polymer layer of polypyrrole formed through electrolytic polymerization.

With such a solid electrolytic capacitor in the prior art, when the dielectric layer includes a defect (for example, crystallization of an amorphous dielectric layer), leakage current may increase. To reduce leakage current, the thickness of the dielectric layer may be increased. However, this would decrease the capacitance. It is thus required that such characteristics of solid electrolytic capacitors be improved.

SUMMARY OF THE INVENTION

The present invention provides a solid electrolytic capacitor that prevents leakage current from increasing.

One aspect of the present invention is a solid electrolytic capacitor including an anode, a cathode, and a dielectric layer arranged between the anode and the cathode in contact with the cathode. The dielectric layer includes a plurality of recesses that are arranged in a surface of the dielectric layer, each recess having an opening in an interface with the cathode. Each of the recesses has a depth that is 0.1 to 1.5 times the diameter of the opening.

A further aspect of the present invention is a method for manufacturing a solid electrolytic capacitor including a dielectric layer between an anode and a cathode. The method includes forming the dielectric layer by anodizing the surface of the anode and applying a cathode material to the cathode on the dielectric layer. The formation of the dielectric layer includes forming a plurality of recesses in the surface of the dielectric layer at an interface with the cathode by varying voltage that is applied during the anodization, with each recess including an opening having a depth that is 0.1 to 1.5 times the diameter of the opening.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a table showing property index evaluation results that are dependent on the average pit depths of solid electrolytic capacitors in examples 1 to 4 and a comparative example; and FIG. 4 is a table showing property index evaluation results that are dependent on the average pit diameters of solid electrolytic capacitors in examples 1, 5 to 12 and the comparative example.

DETAILED DESCRIPTION OF THE PREFERRED EMBODIMENTS

Figure 1:
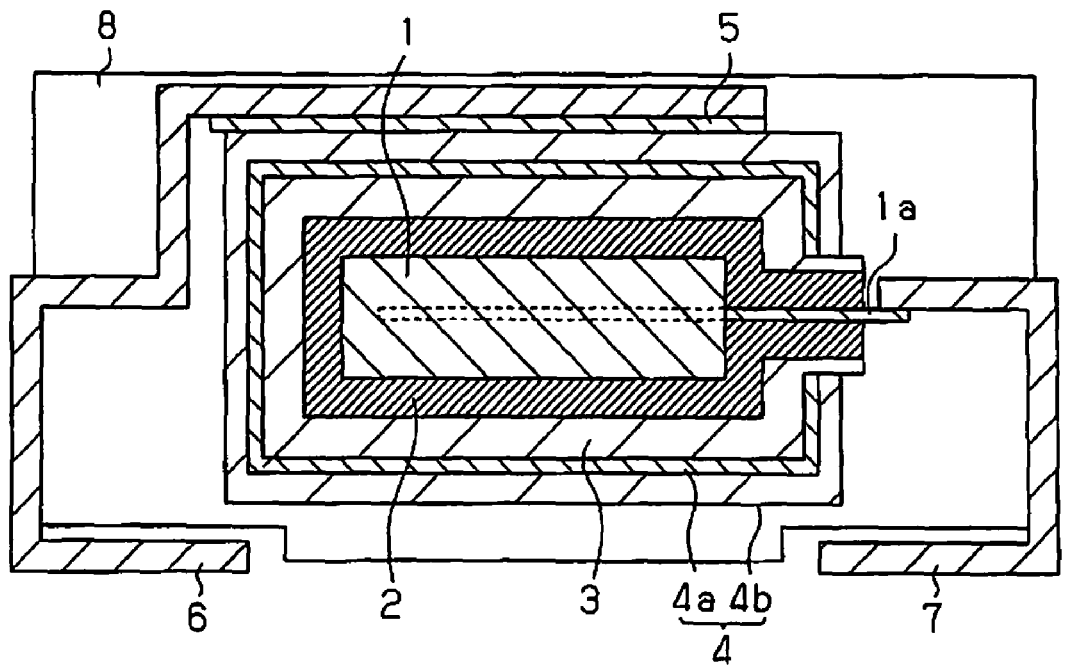
FIG. 1 is a schematic cross-sectional view showing a preferred embodiment of a solid electrolytic capacitor according to the present invention.

In the drawings, like numerals are used for like elements throughout.

Figure 2A:
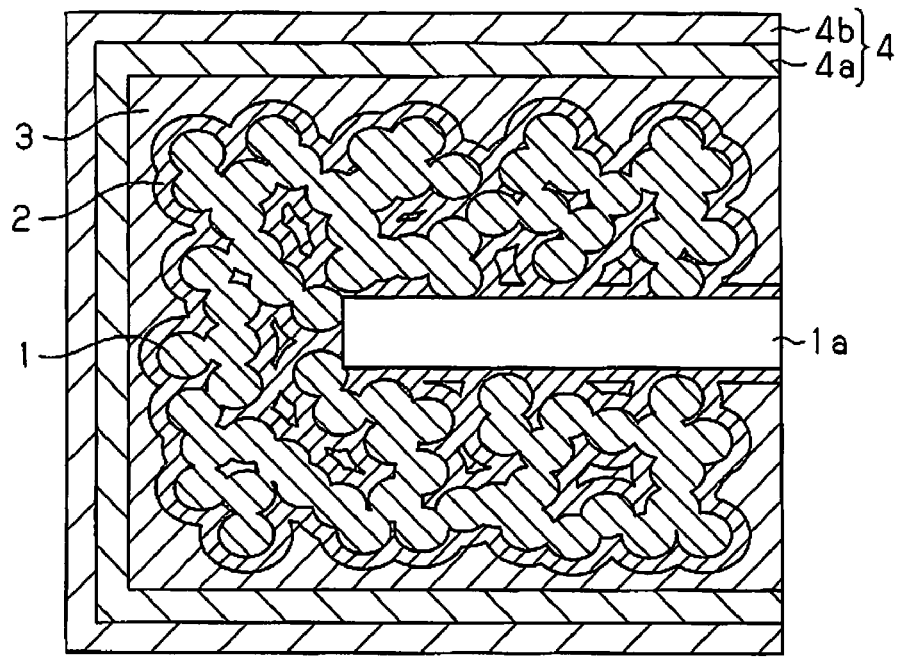
FIG. 2A is an enlarged, schematic cross-sectional view showing the vicinity of an anode body in the solid electrolytic capacitor of FIG. 1.
Figure 2B:
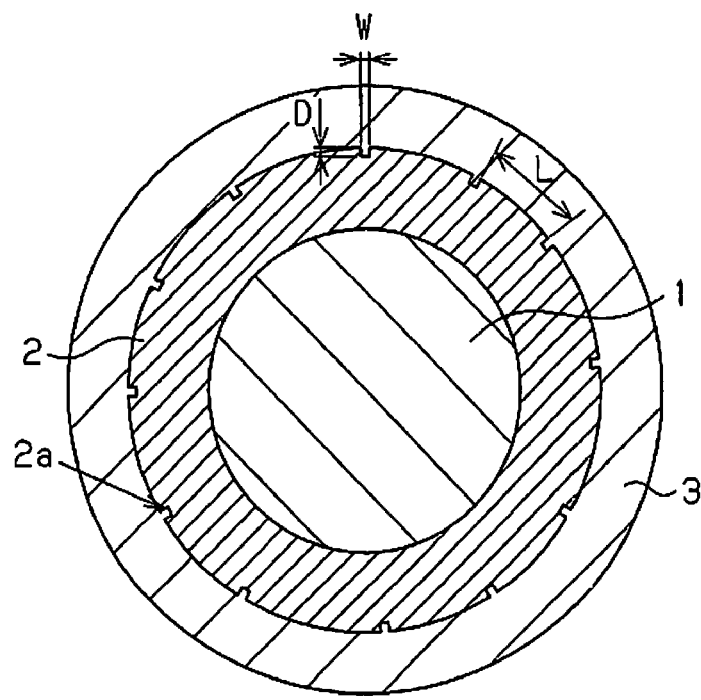
FIG. 2B is an enlarged cross-sectional showing a single metal particle of the anode body.

A preferred embodiment of the present invention will be discussed with reference to the drawings. The present invention is not limited to this embodiment. FIG. 1 is a schematic cross-sectional view showing the structure of a solid electrolytic capacitor in the preferred embodiment. FIG. 2A is an enlarged, schematic cross-sectional view showing the vicinity of an anode body in the solid electrolytic capacitor of FIG. 1, and FIG. 2B is a cross-sectional view showing a single metal particle in the anode body.

As shown in FIG. 1, in the preferred embodiment, the solid electrolytic capacitor includes an anode body 1, a dielectric layer 2 formed on the surface of the anode body 1, a conductive polymer layer 3 formed on the dielectric layer 2, and a cathode layer 4 formed on the conductive polymer layer 3. As shown in FIG. 2B, the dielectric layer 2 includes pore-like pits 2a (recesses) extending in a thicknesswise direction of the dielectric layer 2 towards the anode body 1 (metal particle) from an interface between the dielectric layer 2 and the conductive polymer layer 3. More specifically, the pits 2a are formed in the surface of the dielectric layer 2 and each filled with the conductive polymer layer 3. However, the pits 2a do not all have to be filled with the conductive polymer layer 3. The pits 2a may be partially filled with the conductive polymer layer 3 or be completely hollow and free from the conductive polymer layer 3. Alternatively, some of the pits 2a may be completely or partially filled with the conductive polymer layer 3, while other pits 2a do not include the conductive polymer layer 3 at all.

The structure of the solid electrolytic capacitor will now be discussed in detail.

Referring to FIG. 2A, the anode body 1 is a porous sintered body formed from metal particles of a valve metal. An anode lead 1a, which is formed from a valve metal, is embedded in the anode body 1. The valve metal of the anode lead 1a and the anode body 1 enables the formation of an insulative oxide film, and may be niobium, tantalum, aluminum (Al), titanium (Ti), or the like. An alloy of these valve metals may also be used.

The dielectric layer 2 is a dielectric formed from oxides of the valve metal and arranged with a predetermined thickness on the surface of the anode lead 1a and the anode body 1. If the valve metal includes niobium metal, the dielectric layer 2 is niobium oxide. Referring to FIG. 2B, the plurality of pits 2a (recesses) are dispersed in the surface of the dielectric layer 2 (cathode side surface of the dielectric layer 2). Each pit 2a extends in the thicknesswise direction of the dielectric layer 2 from the surface of the dielectric layer 2 towards the anode body (metal particle) 1. Further, each pit 2a has a predetermined opening diameter W and a predetermined depth D. Moreover, each pit 2a is spaced from the adjacent pit 2a by a predetermined interval L. In the preferred embodiment, the dielectric layer 2 includes fluorine (F), which is concentrated at the anode side of the dielectric layer 2. Specifically, the concentration of fluorine varies along the thicknesswise direction of the dielectric layer 2 (direction from the cathode side to the anode side of the dielectric layer 2) and is maximum at the interface of the dielectric layer 2 and the anode body 1.

The conductive polymer layer 3 functions as an electrolyte layer and is arranged on the surface of the dielectric layer 2, which includes the interior of the pits 2a. The conductive polymer layer 3 is a laminated film of a first conductive polymer layer formed through chemical polymerization and a second conductive polymer layer formed through electrolytic polymerization. The material of the conductive polymer layer 3 (first conductive polymer layer and second conductive polymer layer) is not particularly limited. However, it is preferable that the material that is used have superior conductivity, such as polypyrrole, polythiophene, polyaniline, and polyflan.

The cathode layer 4, which is formed by a laminated film of a carbon layer 4a including carbon particles and a silver paste layer 4b including silver particles, is arranged on the conductive polymer layer 3. The cathode layer 4 and the conductive polymer layer 3 form the cathode. In the preferred embodiment, the three layers of the conductive polymer layer 3, the carbon layer 4a, and the silver paste layer 4b form the cathode. However, the present invention is not limited in such a manner. For example, the cathode may be formed by one or two layers selected from a group including a conductive polymer layer, a carbon layer, and a silver paste layer. Alternatively, the cathode may be formed by other cathode materials. In one example, the cathode is formed by a carbon layer and a silver paste layer and does not use a conductive polymer layer. In this case, the carbon layer enters the pits and the surface of the dielectric layer formed in the porous sintered body. Instead of carbon, other cathode materials can be used. For example, semiconductor particles or metal particles, such as silver or aluminum, may be used. In this manner, a material that results in part of the cathode entering the porous sintered body may be used as the cathode material. For example, instead of a conductive polymer, an oxide, such as manganese dioxide, or a charge transfer complex, such as 7,7,8,8-tetracyanoquinodimethane, may be used. Such a material would cover the surface of the dielectric layer in a porous sintered body and the interior of pits.

In the preferred embodiment, a plate-shaped cathode terminal 6 is connected on the cathode layer 4 by way of a conductive adhesive 5, and a plate-shaped anode terminal 7 is connected to the anode lead 1a. Referring to FIG. 1, the anode terminal 7 and the cathode terminal 6 are partially extended out of a mold package 8, which is formed from epoxy resin or the like. The material of the anode terminal 7 and the cathode terminal 6 may be a conductive material such as nickel (Ni). The ends of the anode terminal 7 and the cathode terminal 6 exposed from the mold package 8 are bent to function as terminals of the solid electrolytic capacitor.

The anode body 1 serves as the "anode" of the present invention. The metal particles of valve metals serve as the "metal particles" of the present invention. The porous sintered body serves as the "sintered body" of the present invention. The dielectric layer 2 serves as the "dielectric layer" of the present invention. The pits 2a serve as the "recesses" of the present invention. The conductive polymer layer 3 serves as the "conductive polymer layer" of the present invention. The conductive polymer layer 3 and the cathode layer 4 serve as the "cathode" of the present invention. The depth D serves as the "depth" of the present invention, and the opening diameter W serves as the "opening diameter" of the present invention.

[Manufacturing Method]

A method for manufacturing the solid electrolytic capacitor shown in FIG. 1 will now be discussed.

Step 1: A green body, which is formed by press forming metal particles that exhibit a valve effect so as to embed part of the anode lead 1a, is sintered in a vacuum environment to form the anode body 1, which is a porous sintered body, around the anode lead 1a. The metal particles are fused to one another.

Step 2: The anode body 1 undergoes anodization in an aqueous solution containing fluoride ions to form the dielectric layer 2 with the oxides of a valve metal that has the predetermined thickness so as to cover the periphery of the anode body 1. In the preferred embodiment, the anodization is performed under a predetermined temperature by varying the applied voltage at a predetermined amplitude and a predetermined cycle to produce a plurality of pits 2a in the surface of the dielectric layer 2 (surface on cathode side). In this case, fluorine enters the dielectric layer 2 and is distributed in a manner concentrated at the anode side of the dielectric layer 2 (interface of dielectric layer 2 and anode body 1).

Step 3: Chemical polymerization is performed to form the first conductive polymer layer on the surface of the dielectric layer 2 and in the pits 2a. Specifically, chemical polymerization forms the first conductive polymer layer by oxidatively polymerizing monomer using an oxidant. Thereafter, electrolytic polymerization is performed to form a second conductive polymer layer on the surface of the first conductive polymer layer. Specifically, during electrolytic polymerization, while using the first conductive polymer layer as an anode, the second conductive polymer layer is formed by performing electro-polymerizing with an external cathode in an electrolytic solution containing monomer and electrolyte. This forms the conductive polymer layer 3 of a laminated film including the first conductive polymer layer and the second conductive polymer layer on the dielectric layer 2 including the interior of the pits 2a.

Step 4: A carbon paste is applied to and dried on the conductive polymer layer 3 to form the carbon layer 4a. A silver paste is applied to and dried on the carbon layer 4a to form the silver paste layer 4b. This forms the cathode layer 4 of the laminated film including the carbon layer 4a and the silver paste layer 4b on the conductive polymer layer 3.

Step 5: After applying the conductive adhesive 5 to the plate-shaped cathode terminal 6, the conductive adhesive 5 is dried between the cathode layer 4 and the cathode terminal 6 so as to connect the cathode layer 4 and the cathode terminal 6 through the conductive adhesive 5. The plate-shaped anode terminal 7 is connected to the anode lead 1a by performing spot welding.

Step 6: A transfer process is performed to mold the mold package 8 from epoxy resin. In this case, the anode lead 1a, the anode body 1, the dielectric layer 2, the conductive polymer layer 3, and the cathode layer 4 are accommodated in the mold package 8, and the ends of the anode terminal 7 and the cathode terminal 6 are extended out of the mold package 8 from opposite directions.

Step 7: The distal ends of the anode terminal 7 and the cathode terminal 6 exposed from the mold package 8 are bent downward and arranged along the lower surface of the mold package 8. The distal ends of the terminals function as terminals of the solid electrolytic capacitor and are used to electrically connect the solid electrolytic capacitor to a substrate.

Through the above steps, the solid electrolytic capacitor of the preferred embodiment is manufactured.

EXAMPLES

In the following examples and comparative examples, the method for manufacturing the solid electrolytic capacitor was performed until the cathode layer was formed. Then, a performance evaluation was performed.

Example 1

In example 1, a solid electrolytic capacitor A1 was fabricated through steps 1A to 4A, which correspond to steps 1 to 4 in the preferred embodiment of a manufacturing method.

Step 1A: Niobium metal powder having a CV value of 150,000 μF·V/g was prepared. The CV value is the product of the capacitance of the niobium porous sintered body after the formation of the dielectric layer and the formation voltage. A green body was formed from the niobium metal powder so as to embed part of the anode lead 1a and then sintered in a vacuum environment at a temperature of approximately 1,200° C. This formed an anode body 1 of niobium porous sintered body. The niobium metal particles were fused to one another. Unless otherwise mentioned, the CV value in each of the following examples and comparative examples is 150,000 μF·V/g.

Step 2A: Anodization was performed on the anode body 1 for ten hours with a center voltage of 20 V (amplitude of 0.20 V, cycle of 10 minutes) in an ammonium fluoride aqueous solution of 0.1% by weight held at a temperature maintained at 40° C. This formed the dielectric layer 2 from niobium oxide containing fluorine so as to cover the periphery of the anode body 1, and a plurality of bore-shaped pits 2a were formed in the surface of the dielectric layer 2 (surface on cathode side). In this case, the concentration of fluorine in the thicknesswise direction of the dielectric layer 2 is maximum at the interface of the dielectric layer 2 and the anode body 1. The ammonium fluoride aqueous solution was voltage-controlled to finish the bore-shaped pits 2a with the average of the opening diameter W being 2.5 nm and the average of the depth D being 2.5 nm (1.0 times the average diameter). With respect to the opening diameter W in the present invention, about one hundred pits were randomly extracted from a cross-sectional transmission electron microscope (TEM) image of the vicinity of the anode body. Then, the maximum diameter in the cross-section of each pit was used as the opening diameter, and the average of such opening diameters was obtained as the average opening diameter. In the same manner, with respect to the depth D, about one hundred pits were randomly extracted, and the average of the depths was obtained as the average depth.

Step 3A: The anode body 1 on which is formed the dielectric layer 2 with a surface including the pits 2a was immersed in an oxidant solution and then immersed in a pyrrole monomer solution to polymerize the pyrrole monomer on the dielectric layer 2. This formed the first conductive polymer of polypyrrole on the dielectric layer 2. Subsequently, while using the first conductive polymer layer as an anode, the second conductive polymer layer was further formed with a predetermined thickness on the first conductive polymer layer by performing electrolytic polymerization in the electrolytic solution containing the pyrrole monomer and the electrolyte. This formed the second conductive polymer layer of polypyrrole on the first conductive polymer layer. In this manner, the conductive polymer layer 3 including a laminated film of the first conductive polymer layer and the second conductive polymer layer was formed on the surface of the dielectric layer 2 having the pits 2a.

Step 4A: Carbon paste was applied to and dried on the conductive polymer layer 3 to form the carbon layer 4a, which is a layer of carbon particles, and silver paste was applied to and dried on the carbon layer 4a to form the silver paste layer 4b, which is a layer of silver particles. This formed the cathode layer 4 of a laminated film including the carbon layer 4a and the silver paste layer 4b on the conductive polymer layer 3.

The solid electrolytic capacitor A1 of example 1 was fabricated in this manner.

Example 2

In example 2, a solid electrolytic capacitor A2 was fabricated by setting the temperature to 30° C. instead of 40° C. to form the dielectric layer having dielectric pits in step 2A. Otherwise, the solid electrolytic capacitor A2 was fabricated in the same manner as in example 1. The pits formed under such conditions had an average diameter of 2.5 nm and an average depth of 0.25 nm (0.1 times the average diameter).

Examples 3 and 4

In examples 3 and 4, solid electrolytic capacitors A3 and A4 were fabricated by setting the temperature to 35° C. and 45° C. instead of 40° C. to form the dielectric layer having dielectric pits in step 2A. Otherwise, the solid electrolytic capacitors A3 and A4 were fabricated in the same manner as in example 1. The pits formed under such conditions had an average diameter of 2.5 nm and average depths of 1.25 nm (0.5 times the average diameter) and 3.75 nm (1.5 times the average diameter).

Example 5

In example 5, a solid electrolytic capacitor A5 was fabricated with voltage control conditions during the anodization in step 2A being changed from the cycle of ten minutes (center voltage of 20 V, amplitude of 0.20 V) to the cycle of five minutes (center voltage of 20 V, amplitude of 0.20 V) to form the dielectric layer having dielectric pits in step 2A. Otherwise, the solid electrolytic capacitor A5 was fabricated in the same manner as in example 1. The pits formed under such conditions had an average diameter of 0.2 nm and an average depth of 0.2 nm (1.0 times the average diameter).

Examples 6 to 12

In examples 6 to 12, solid electrolytic capacitors A6 to A12 were fabricated with voltage control conditions during the anodization in step 2A being changed from the cycle of ten minutes (center voltage of 20 V, amplitude of 0.20 V) to the cycles of two minutes, seven minutes, thirteen minutes, fifteen minutes, seventeen minutes, twenty minutes, and sixty minutes (center voltage of 20 V, amplitude of 0.20 V). Otherwise, the solid electrolytic capacitors A6 to A12 were fabricated in the same manner as in example 1. The pits formed under such conditions had an average diameter of 0.1 nm to 70.0 nm (refer to FIG. 4) and an average depth of 0.1 nm to 170.0 nm (1.0 times the average diameter).

Comparative Example

In a comparative example, a solid electrolytic capacitor X was fabricated with voltage control conditions during the anodization performed in step 2A being the same as the prior art in which a constant voltage (voltage 20 V) was used. Otherwise, the solid electrolytic capacitor X was fabricated in the same manner as in example 1. Under such conditions, the dielectric layer was formed without any pits in its surface.

[Evaluation]

Performance indexes of which parameters were the leakage current and capacitance were evaluated for the solid electrolytic capacitors. FIG. 3 is a table showing property index evaluation results that are dependent on the average pit depths, and FIG. 4 is a table showing property index evaluation results that are dependent on the average pit diameters. Each property index is the average value for ten samples.

The property index is calculated from equation (1), which is shown below using the leakage current, capacitance, and rated voltage. A smaller property index indicates a higher capacitor capacity.

performance index=(leakage current (μA)/capacitance (μF)×rated voltage (V)    equation (1)

The leakage current was determined by applying 2.5 V (corresponding to the rated voltage) to each solid electrolytic capacitor and measuring the current with an ammeter twenty seconds later.

The capacitance (capacitor of solid electrolytic capacitor at a frequency of 120 Hz) was measured with an LCR meter for each solid electrolytic capacitor.

As apparent from FIG. 3, the property index is improved in examples 1 to 4 (solid electrolytic capacitors A1 to A4) having pits of different average depths in the surface of the dielectric layer compared to the comparative example (solid electrolytic capacitor X) of the prior art. It is believed that this is because the pits of the dielectric layer prevented the leakage current from increasing. In other words, at portions of the dielectric layer where the conductive polymer layer is filled in the pits (filled pits) or portions of the dielectric layer where the conductive polymer layer is not filled in the pits (hollow pits), the stress generated in the dielectric layer during fabrication or usage is moderated by the deformation (expansion and contraction) of such filled and hollow pits. As a result, fewer defects occur in the dielectric layer compared to when the pits are not formed in the dielectric layer.

As apparent from FIG. 4, the property index is improved in examples 1 and 5 to 12 (solid electrolytic capacitors A1 and A5 to A12) having pits of different average diameters in the surface of the dielectric layer compared to the comparative example (solid electrolytic capacitor X) of the prior art. It is believed that this is because the pits of the dielectric layer (filled pits and hollow pits) prevented the leakage current from increasing. When the average pit diameter in these examples is in the range of 0.2 nm to 50.0 nm, the property index can be further improved. When the average pit diameter is 0.1 nm, improvement in the index property is relatively small. It is believed that this is because the pits of the dielectric layer are too small to obtain the stress moderation effect. Further, when the average pit diameter is 70.0 nm, improvement in the index property is relatively small. It is believed that this is because the conductive polymer layer filled in the pits is relatively easily separated from the pits and thereby decreases the capacitance.

The solid electrolytic capacitor of the preferred embodiment has the advantages described below.

(1) Bore-shaped pits $2a$ are formed in the surface of the dielectric layer 2 (cathode side surface), with the depths of the pits $2a$ being in the range of 0.1 times to 1.5 times the average diameter. This prevents the occurrence of defects in the dielectric layer that would be caused by stress generated in the dielectric layer during fabrication or usage. As a result, a solid electrolytic capacitor that prevents leakage current from increasing is obtained.

(2) The dielectric layer 2 is formed with a predetermined thickness on the surface of each metal particle of the anode body 1, and the pits $2a$ are formed in the thicknesswise direction of the dielectric layer 2. Thus, the pits $2a$ are arranged in a highly concentrated manner in the surface of the dielectric layer 2, and the stress moderating effect of the pits $2a$ is further improved. As a result, advantage (1) becomes further outstanding.

(3) The opening diameters of the pits $2a$ in the surface of the dielectric layer 2 is set to be in the range of 0.2 nm to 50.0 nm. This results in advantages (1) and (2) becoming further outstanding.

(4) The dielectric layer 2 contains fluorine, which is concentrated near the anode side surface (interface of dielectric layer 2 and anode body 1) to suppress the diffusion of oxygen from the dielectric layer 2 to the anode body 1. This prevents the thickness of the dielectric layer 2 from decreasing. Thus, leakage current of the solid electrolytic capacitor is further decreased.

(5) The preferred embodiment of a method for manufacturing a solid electrolytic capacitor includes the step of forming the dielectric layer 2 by anodizing the surface of the anode 1 and the step of forming the conductive polymer layer 3 on the dielectric layer 2. The step of forming the dielectric layer 2 includes forming a plurality of pits $2a$ in the surface of the dielectric layer 2 by varying the application voltage during the anodization at a predetermined amplitude and predetermined cycle. Furthermore, the anodization is conducted in the electrolytic solution containing fluoride ions.

The manufacturing method obtains the optimal solid electrolytic capacitor as described in advantages (1) to (4).

(6) In the preferred embodiment of a method for manufacturing a solid electrolytic capacitor, the plurality of pits $2a$ are formed in the surface of the dielectric layer 2 just by changing the voltage control conditions during anodization. This manufactures a solid electrolytic capacitor that prevents leakage current from increasing.

It should be apparent to those skilled in the art that the present invention may be embodied in many other specific forms without departing from the spirit or scope of the invention. Particularly, it should be understood that the present invention may be embodied in the following forms.

In the above examples, anodization is performed using ammonium fluoride aqueous solution as the electrolytic solution that contains fluoride ions. However, the present invention is not limited in such a manner. For example, the electrolytic solution may be a potassium fluoride aqueous solution, a sodium fluoride aqueous solution, or a hydrofluoric acid aqueous solution. Further, such electrolytic solutions may be mixed.

The present examples and embodiments are to be considered as illustrative and not restrictive, and the invention is not to be limited to the details given herein, but may be modified within the scope and equivalence of the appended claims.

What is claimed is:

1. A solid electrolytic capacitor comprising:
    an anode formed by a sintered body including a plurality of metal particles;
    a cathode; and
    a dielectric layer arranged between the anode and the cathode in contact with the cathode and formed to have a predetermined thickness on the surface of each of the metal particles;

wherein the dielectric layer includes a plurality of recesses that are arranged in the surface of the dielectric layer, each recess having an opening in an interface with the cathode; and each of the recesses extends in a thicknesswise direction of the dielectric layer and has a depth that is 0.1 to 1.5 times the diameter of the opening.

2. The solid electrolytic capacitor according to claim 1, wherein the opening of each of the recess has a diameter that is in the range of 0.2 nm to 50.0 nm.

3. The solid electrolytic capacitor according to claim 1, wherein the cathode includes a conductive polymer layer that is in contact with the dielectric layer.

4. A method for manufacturing a solid electrolytic capacitor including a dielectric layer between an anode and a cathode, the method comprising:

forming the dielectric layer by anodizing the surface of the anode; and applying a cathode material to the cathode on the dielectric layer;

wherein said forming the dielectric layer includes forming a plurality of recesses in the surface of the dielectric layer at an interface with the cathode by varying voltage that is applied during the anodization, with each recess including an opening having a depth that is 0.1 to 1.5 times the diameter of the opening.

5. The method according to claim 4, wherein said forming the dielectric layer includes performing the anodization in an electrolytic solution containing fluoride ions.

* * * * *